United States Patent
Iga et al.

(10) Patent No.: US 10,811,922 B2
(45) Date of Patent: Oct. 20, 2020

(54) MOTOR

(71) Applicant: Nidec Corporation, Kyoto (JP)

(72) Inventors: Tomoki Iga, Kyoto (JP); Shunsuke Murakami, Kyoto (JP); Hidehiro Haga, Kyoto (JP)

(73) Assignee: Nidec Corporation, Kyoto (JP)

( * ) Notice: Subject to any disclaimer, the term of this patent is extended or adjusted under 35 U.S.C. 154(b) by 274 days.

(21) Appl. No.: 15/765,724

(22) PCT Filed: Oct. 7, 2016

(86) PCT No.: PCT/JP2016/079966
§ 371 (c)(1),
(2) Date: Apr. 4, 2018

(87) PCT Pub. No.: WO2017/061608
PCT Pub. Date: Apr. 13, 2017

(65) Prior Publication Data
US 2018/0287449 A1 Oct. 4, 2018

(30) Foreign Application Priority Data

Oct. 9, 2015 (JP) .................................. 2015-201339

(51) Int. Cl.
*H02K 3/50* (2006.01)
*H02K 3/12* (2006.01)
(Continued)

(52) U.S. Cl.
CPC ............ *H02K 3/50* (2013.01); *H01R 25/161* (2013.01); *H01R 25/168* (2013.01); *H02K 3/12* (2013.01);
(Continued)

(58) Field of Classification Search
CPC .. H02K 3/28; H02K 3/50; H02K 3/52; H02K 5/22; H02K 5/225; H02K 3/12;
(Continued)

(56) References Cited

U.S. PATENT DOCUMENTS 6,914,356 B2   7/2005   Yamamura et al.
7,514,829 B2   4/2009   Otsuji et al.
(Continued)

FOREIGN PATENT DOCUMENTS

JP    5-103497 A     4/1993
JP    2010-110160 A  5/2010
(Continued)

OTHER PUBLICATIONS

Hirano Takao; Ito Wataru; Kato Hironori; Ohashi Masanori, Rotating Electrical Machine, May 13, 2010 Toshiba Corp, JP 2010110160 (English Machine Translation) (Year: 2010).*

(Continued)

*Primary Examiner* — Quyen P Leung
*Assistant Examiner* — Alexander A Singh
(74) *Attorney, Agent, or Firm* — Keating & Bennett, LLP

(57) ABSTRACT

A motor includes a stator including a stator core and coils, and neutral point bus bars disposed on a first side of the coils in an axial direction. The plural coils include a first coil group of a first control system, and a second coil group of a second control system. The neutral point bus bars include a first neutral point bus bar to which the coils of the first coil group are electrically connected, and a second neutral point bus bar to which the coils of the second coil group are connected. At least two of the neutral point bus bars are disposed at positions that overlap each other in the radial direction.

16 Claims, 9 Drawing Sheets

(51) Int. Cl.
 *H02K 15/10* (2006.01)
 *H02K 3/52* (2006.01)
 *H01R 25/16* (2006.01)
 *H02K 3/28* (2006.01)

(52) U.S. Cl.
 CPC ............. *H02K 3/28* (2013.01); *H02K 3/522* (2013.01); *H02K 15/10* (2013.01); *H02K 2203/09* (2013.01)

(58) Field of Classification Search
 CPC .... H02K 15/10; H02K 2203/09; H02K 3/522; H01R 25/161; H01R 25/168
 USPC .......................................................... 310/71
 See application file for complete search history.

(56) References Cited

U.S. PATENT DOCUMENTS

| 9,627,936 | B2 | 4/2017 | Nakano et al. |
| 2008/0242124 | A1* | 10/2008 | Otsuji ................. H01R 25/161 439/76.2 |
| 2014/0159519 | A1* | 6/2014 | Forveille ................ H02K 3/522 310/71 |

FOREIGN PATENT DOCUMENTS

| JP | 2010113160 A | * | 5/2010 |
| JP | 2013-236455 A | | 11/2013 |
| JP | 2013236455 A | * | 11/2013 |
| JP | 2014-197951 A | | 10/2014 |
| WO | 2009/113520 A1 | | 9/2009 |

OTHER PUBLICATIONS

Yamashita Yuji, Stator and Motor, Asmo Co Ltd, Nov. 21, 2013, JP 2013236455 (English Machine Translation) (Year: 2013).*
Official Communication issued in International Patent Application No. PCT/JP2016/079966, dated Dec. 27, 2016.

* cited by examiner

MOTOR

BACKGROUND OF THE INVENTION

1. Field of the Invention

The present disclosure relates to a motor.

2. Description of the Related Art

A motor including a redundant motor configuration is known. A redundant motor configuration is a configuration allowing the rotation function of the motor to continue even in a case in which a functional portion of the motor has failed. For example, as a motor having a redundant configuration, a motor having a plurality of coil groups having different control systems is known. By including a plurality of coil groups having different control systems in a single motor, the rotation function of the motor can be continued by using the other control system even in a case in which a portion of one of the control system has failed.

Furthermore, conventionally, a motor is known that uses conductive components referred to as bus bars in the connection in the motor. In such a motor, the coils, or the coils and an external control unit are electrically connected to each other through the bus bars. Typically, in a motor having a single control system, there are cases in which at least four bus bars that corresponds to three phase bus bars corresponding to each of the three phases, and a single neutral point bus bars are used.

In a motor including a plurality of coil groups having different control systems, when a bus bar is used, a plurality of bus bars will be needed. Accordingly, in a motor that includes a plurality of coils groups having different control systems, the number of bus bars significantly increases, and the number of connection portions between the bus bars and line ends of the coils significantly increases.

In such a case, when the connection portions between the bus bars and the line ends of the coils are arranged in a circumferential direction, the intervals between the connection portions become small. When the intervals between the connection portions are small, work efficiency of the process of connecting the bus bars and the line ends of the coils to each other decreases.

SUMMARY OF THE INVENTION

A preferred embodiment of the present application is a motor including a stator, and a plurality of neutral point bus bars, in which the stator includes a stator core including an annular core back extending about a central axis, and a plurality of teeth extending from the core back in a radial direction, and a plurality of coils defined by lengths of conducting wire wound around circumferences of the teeth, in which the plurality of coils include a first coil group that includes the plurality of coils pertaining to a first control system, and a second coil group that includes the plurality of coils pertaining to a second control system, in which the plurality of neutral point bus bars are disposed on a first side of the coils in an axial direction, in which the plurality of neutral point bus bars include a first neutral point bus bar to which line ends of at least three of the coils included in the first coil group are electrically connected, and a second neutral point bus bar to which line ends of at least three of the coils included in the second coil group are electrically connected, and in which at least two of the plurality of neutral point bus bars are disposed at positions that overlap each other in the radial direction.

The above and other elements, features, steps, characteristics and advantages of the present invention will become more apparent from the following detailed description of the present preferred embodiments with reference to the attached drawings.

DETAILED DESCRIPTION OF THE PRESENT PREFERRED EMBODIMENTS

Hereinafter, preferred embodiments of the present invention will be described with reference to the drawings. Note that in the present specification, a direction parallel to a central axis of a motor is referred to as an "axial direction", a direction orthogonal to the central axis of the motor is referred to as a "radial direction", and a direction along an arc about a center of the central axis of the motor is referred to as a "circumferential direction". Furthermore, in the present application, a "parallel direction" includes a substantially parallel direction as well. Furthermore, in the present specification, an "orthogonal direction" includes a substantially orthogonal direction as well. A "first side in the axial direction" is the upper side in the axial direction in FIG. 1, and a "second side in the axial direction" is the lower side in the axial direction in FIG. 1.

Figure 1:
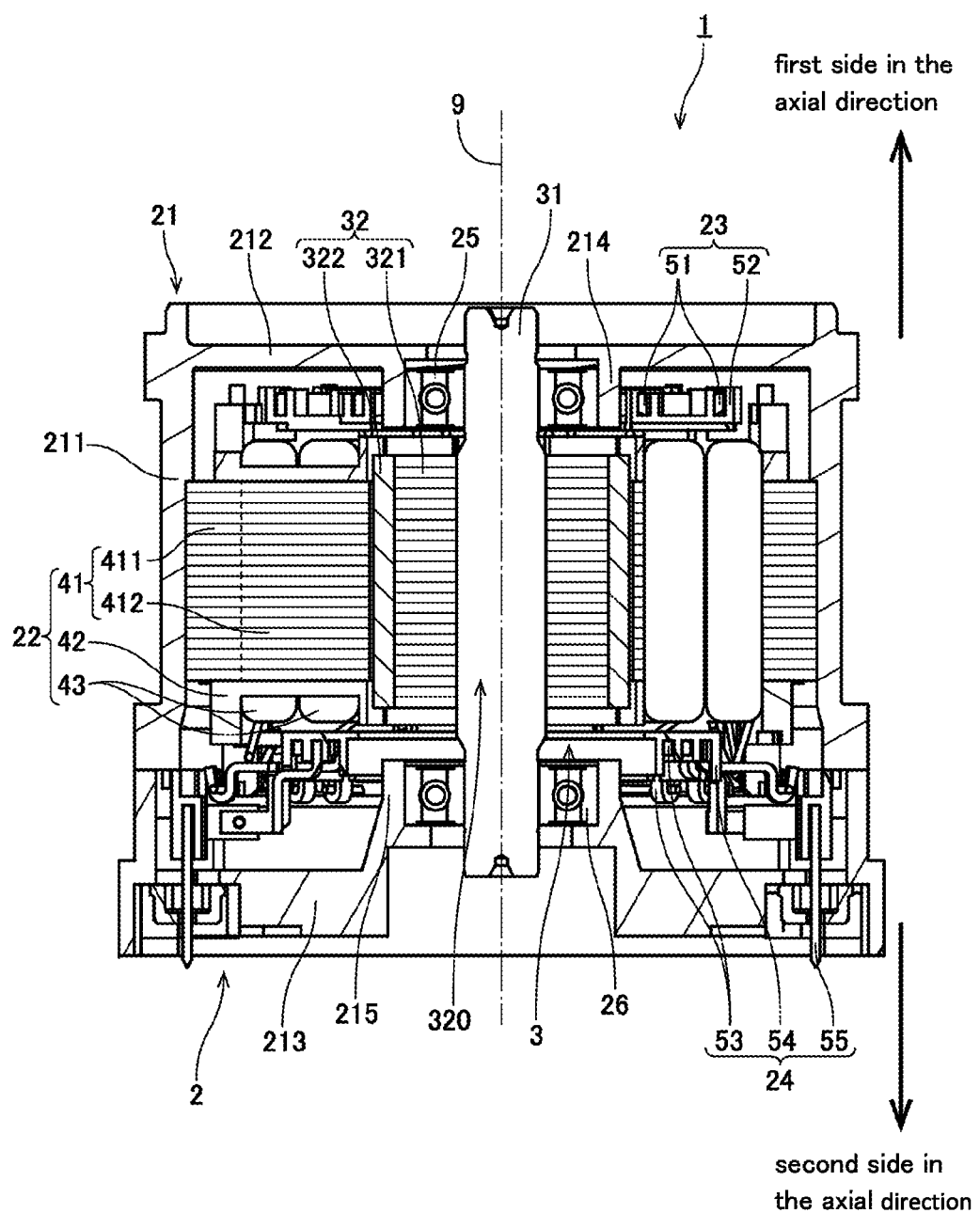
FIG. 1 is a longitudinal section of a motor according to a preferred embodiment of the present invention.

FIG. 1 is a longitudinal section of a motor 1 according to a preferred embodiment of the present disclosure. The motor 1 of the present preferred embodiment is, for example, mounted in a vehicle and is used to generate driving force of a power steering. Note that the motors according to preferred embodiments of the present disclosure may be used in applications other than a power steering. For example, the motors according to preferred embodiments of the present disclosure may be a motor that is used in other parts of the vehicle such as, for example, a fan for cooling an engine and a drive source of an oil pump. Furthermore, the motors according to preferred embodiments of the present disclosure may be a motor that is mounted in a household electric appliance, OA equipment, medical equipment, or the like and that generates various types of driving force.

As illustrated in FIG. 1, the motor 1 includes a stationary portion 2 and a rotating portion 3. The stationary portion 2 is fixed to a frame of a piece of equipment that is a drive object. The rotating portion 3 is supported about a central axis 9 in a rotatable manner with respect to the stationary portion 2.

In the present preferred embodiment, the stationary portion 2 preferably includes a housing 21, a stator 22, neutral point bus bar assembly 23, phase bus bar assembly 24, a first bearing 25, and a second bearing 26.

The housing 21 includes a cylindrical portion 211, a first lid portion 212, and a second lid portion 213. The cylindrical portion 211 extends in the axial direction defining a cylindrical or substantially cylindrical shape. The cylindrical portion 211 houses therein in the radial direction the stator 22 and a rotor 32 (described later). On the first side in the axial direction with respect to the stator 22 and the neutral point bus bar assembly 23, the first lid portion 212 extends inwards in the radial direction from the cylindrical portion 211. On the second side in the axial direction with respect to the stator 22, the second lid portion 213 extends inwards in the radial direction from the cylindrical portion 211. Note that the first lid portion 212 and the second lid portion 213 may each include a flange portion that extends outwards in the radial direction from the cylindrical portion 211.

The cylindrical portion 211, the first lid portion 212, and the second lid portion 213 are all preferably made of a metal such as, for example, aluminum, stainless steel, etc. In the present preferred embodiment, the cylindrical portion 211 and the first lid portion 212 are preferably defined by a single monolithic member, and the second lid portion 213 is defined by another member. Note that the cylindrical portion 211 and the second lid portion 213 may be defined by a single monolithic member, and the first lid portion 212 may be defined by another member, if so desired. The cylindrical portion 211, the first lid portion 212, and the second lid portion 213 may each be defined by a separate member.

The stator 22 is an armature disposed outside of the rotor 32 described later in the radial direction. The stator 22 preferably includes a stator core 41, insulators 42, and a plurality of coils 43.

The stator core 41 is preferably defined by a lamination steel plate in which electromagnetic steel plates are laminated in the axial direction. The stator core 41 includes an annular or substantially annular core back 411 about the central axis 9 and a plurality of teeth 412 that extend inwards in the radial direction from the core back 411. The core back 411 is disposed coaxially or substantially coaxially with the central axis 9. An outer circumferential surface of the core back 411 fixed to an inner circumferential surface of the cylindrical portion 211 of the housing 21. The plurality of teeth 412 are disposed in an equidistant or substantially equidistant manner in the circumferential direction.

The material of the insulators 42 is an insulating material and is preferably a resin that has insulation properties. Both end surfaces of each of the teeth 412 in the axial direction and both end surfaces thereof in the circumferential direction are covered by the insulator 42. The coils 43 are each preferably defined by a length of conducting wire wound around the insulator 42. In other words, the insulators 42 interposing between the teeth 412 and the coils 43 prevent the teeth 412 and the coils 43 from electrically short-circuiting with one another. Note that in place of the insulators 42, an insulating coating may be applied to the surfaces of the teeth 412.

Note that in the present preferred embodiment, as illustrated in FIG. 1, two coils 43 are disposed around a single insulator. One of two line ends of each coil 43 is connected to a neutral point bus bar 51 described later, and the other thereof is connected to a phase bus bar 53 described later. Note that "the line ends of the coils 43" are end portions of the lengths of conducting wire constituting the coils 43. Note that between the two line ends of each coil 43, the one connected to the neutral point bus bar 51 is referred to as a line end 430.

The neutral point bus bar assembly 23 is preferably disposed on the first side of the stator 22 in the axial direction and on the second side of the first lid portion 212 in the axial direction. The neutral point bus bar assembly 23 includes six neutral point bus bars 51, for example, and a resin bus bar holder 52 that holds the neutral point bus bars 51. The neutral point bus bars 51 are defined by a material that has a high electrical conduction property such as, for example, copper. A plurality of line ends 430 of the coils 43 are connected to each neutral point bus bar 51. In other words, a plurality of coils 43 are electrically connected to each other through the corresponding neutral point bus bar 51.

The phase bus bar assembly 24 includes six phase bus bars 53, a resin phase bus bar holder 54 that holds the phase bus bars 53, and six contact pins 55, for example. The phase bus bars 53 and the phase bus bar holder 54 are each disposed on the second side of the stator 22 in the axial direction and on the first side of the second lid portion 213 in the axial direction. The contact pins 55 each penetrate the second lid portion 213 in the axial direction.

A line end of at least one coil 43 is connected to each phase bus bar 53. Furthermore, the contact pins 55 are, on the first side of the second lid portion 213 in the axial direction, electrically connected to the phase bus bars 53. While the motor 1 is in use, the contact pins 55 are on the second side of the second lid portion 213 in the actual direction. In other words, the contact pins 55 are electrically connected to an external power supply at a portion external to the housing 21. When the motor 1 is driven, a driving current is supplied to the coils 43 from the external power supply through the contact pins 55 and the phase bus bars 53.

Note that hereinafter, the stator 22, the neutral point bus bar assembly 23, and the phase bus bar assembly 24 will be collectively referred to as a stator assembly 20 (see FIGS. 3 and 4). Furthermore, a further detailed structure of the neutral point bus bar assembly 23, and the electrical connections between the coils 43, the neutral point bus bars 51, and the phase bus bars 53 will be described later.

The first bearing 25 and the second bearing 26 are disposed between the housing 21 and a shaft 31 described later of the rotating portion 3. With the above structure, the first bearing 25 and the second bearing 26 support the shaft 31 in a rotatable manner with respect to the housing 21. A ball bearing that relatively rotates an outer ring and an inner ring with spherical bodies interposed therebetween is preferably used for each of the first bearing 25 and the second bearing 26 of the present preferred embodiment. However, in place of the ball bearing, other forms of bearing such as a slide bearing, a fluid bearing, or the like may be used for the first bearing 25 and the second bearing 26.

The first bearing 25 is disposed on the first side in the axial direction with respect to the rotor 32 and the coils 43. Note that the first lid portion 212 includes, at a center or substantially at a center thereof, a first bearing housing portion 214 that houses the first bearing 25. The first bearing housing portion 214 is a cylindrical-shaped portion that extends along the central axis 9. An outer ring of the first bearing 25 is fixed to an inner circumferential surface of the first bearing housing portion 214.

The neutral point bus bar assembly 23 is disposed outside of the first bearing housing portion 214 in the radial direction. In other words, the neutral point bus bars 51 is disposed at a position that overlaps the first bearing 25 in the radial direction. By having the first bearing 25 and the neutral point bus bar assembly 23 overlap each other in the radial direction, an increase in the size of the motor 1 in the axial direction is prevented.

Meanwhile, the second bearing 26 is disposed on the second side in the axial direction with respect to the rotor 32 and the coils 43. Note that the second lid portion 213 includes, at a center or substantially at a center thereof, a second bearing housing portion 215 that houses the second bearing 26. The second bearing housing portion 215 is a cylindrical-shaped portion that extends along the central axis 9. An outer ring of the second bearing 26 is fixed to an inner circumferential surface of the second bearing housing portion 215.

In the phase bus bar assembly 24, the phase bus bars 53 and the phase bus bar holder 54 are preferably disposed outside of the second bearing housing portion 215 in the radial direction. In other words, the phase bus bars 53 is disposed at a position that overlaps the second bearing 26 in the radial direction. By having the second bearing 26 and a portion of the phase bus bar assembly 24 overlap each other in the radial direction, an increase in the size of the motor 1 in the axial direction is prevented.

In the present preferred embodiment, the rotating portion 3 includes the shaft 31 and the rotor 32.

The shaft 31 is a columnar member that extends along the central axis 9. The material of the shaft 31 is preferably a metal material such as, for example, stainless steel. The shaft 31 is supported by the first bearing 25 and the second bearing 26 and rotates about the central axis 9. An end portion of the shaft 31 on the first side in the axial direction is protruded on the first side in the axial direction with respect to the first lid portion 212. An end portion of the shaft 31 on the second side in the axial direction is protruded on the second side in the axial direction with respect to the second lid portion 213. A device that is the drive object is connected to at least either of the end portion of the shaft 31 on the first side in the axial direction and the end portion thereof on the second side in the axial direction to a power transmission mechanism, such as a gear. Note that the material of the shaft 31 is not limited to the material described above, and another material may be used. The shaft 31 may be solid or may be hollow.

As described above, by disposing the neutral point bus bar assembly 23 and the first bearing 25, and the phase bus bar assembly 24 and the second bearing 26 at positions that overlap each other in the radial direction, the distances between the center of gravity of the motor 1 and the end portions of the shaft can be made short. Accordingly, the distance in the axial direction between the center of gravity of the motor 1 and the device that is the drive object can be made short. If the distance in the axial direction between the center of gravity of the motor 1 and the device that is the drive object is short, the vibration generated in either one of the motor 1 and the device will not be easily amplified to the other when transmitted. Accordingly, the vibration in the motor 1 and the device is able to be suppressed or minimized.

The rotor 32 is disposed inside the stator 22 in the radial direction. The rotor 32 rotates together with the shaft. The rotor 32 includes a rotor core 321 and a plurality of magnets 322.

In the present preferred embodiment, the rotor core 321 is preferably defined by a lamination steel plate in which electromagnetic steel plates are laminated in the axial direction. An insertion hole 320 that extends in the axial direction is provided at the center of the rotor core 321. The shaft 31 is disposed inside the insertion hole 320 of the rotor core 321. An outer circumferential surface of the shaft 31 and an inner circumferential surface of the rotor core 321 are fixed to each other.

The plurality of magnets 322 are preferably fixed to an outer circumferential surface of the rotor core 321 with an adhesive agent, for example. Surfaces of the magnets 322 on the outside in the radial direction are pole faces that oppose end surfaces of the teeth 412 on the inside in the radial direction. The plurality of magnets 322 are arranged in the circumferential direction so that the N-poles and the S-poles are aligned alternately. Note that in place of the plurality of magnets 322, an annulus magnet in which N-poles and S-poles are alternately magnetized in the circumferential direction may be used. Furthermore, the plurality of magnets 322 may be embedded in the rotor core 321.

A magnetic flux is generated in the plurality of teeth 412 of the stator core 41 when a driving current from the external power supply flows to the coils 43 through the phase bus bars 53. Furthermore, a torque in the circumferential direction is generated with the action of the magnetic flux between the teeth 412 and the magnets 322. As a result, the rotating portion 3 can be rotated about the central axis 9 with respect to the stationary portion 2.

Figure 2:
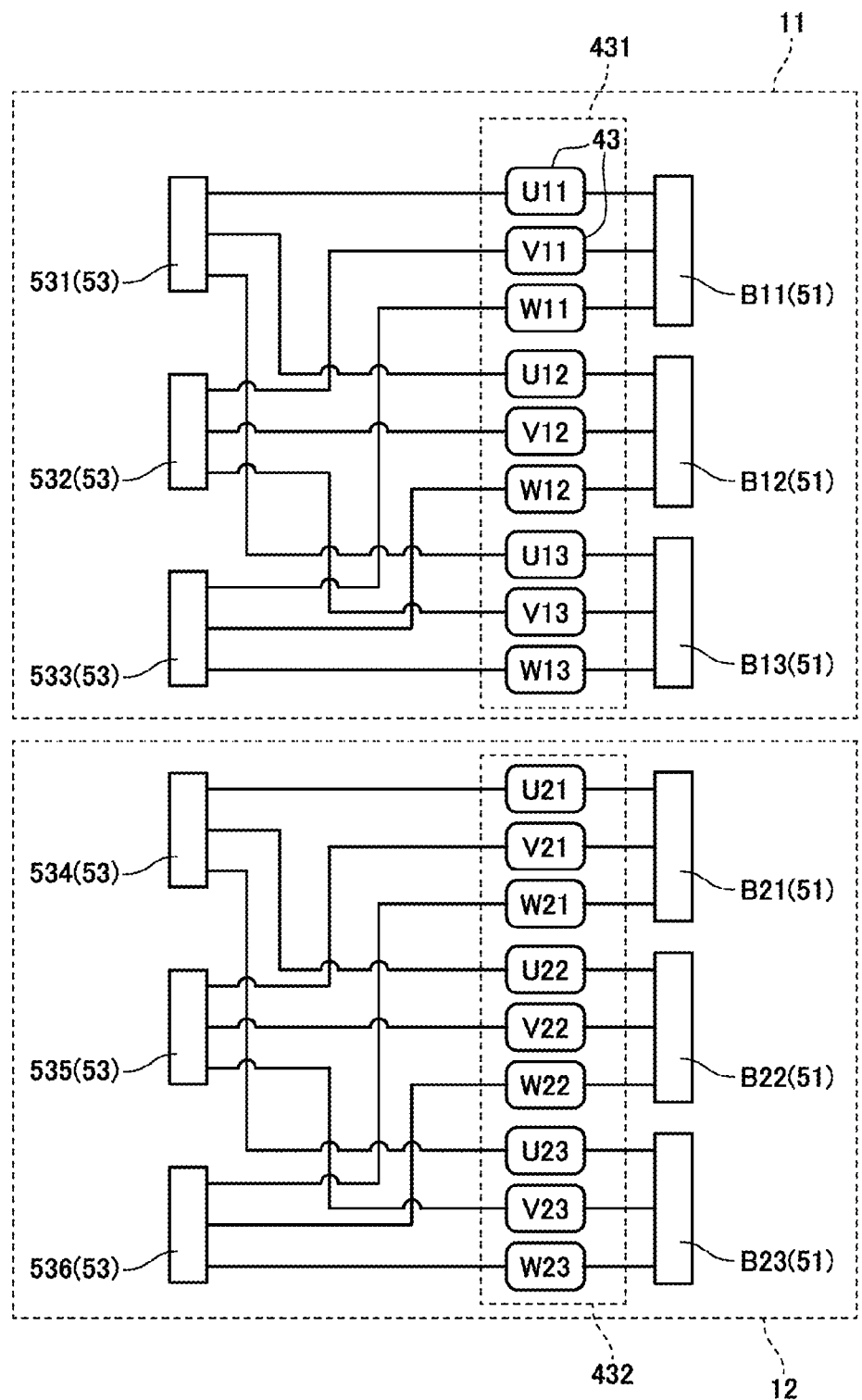
FIG. 2 is a diagram illustrating a circuit configuration of the motor according to a preferred embodiment of the present invention.

Details of the electric connections in the motor 1 will be described next. FIG. 2 is a diagram illustrating a circuit configuration of the motor 1.

As illustrated in FIG. 2, the motor 1 preferably includes six neutral point bus bars 51, for example. The motor 1 preferably includes 18 coils 43. The 18 coils 43, the six neutral point bus bars 51, and the six phase bus bars 53 are separated into a first controller 11 and a second controller 12. The first controller 11 and the second controller 12 operate separately. In other words, the first controller 11 and the second controller 12 are not electrically connected to each other.

The 18 coils 43 preferably include a first coil group 431 pertaining to the first controller 11, and a second coil group 432 pertaining to the second controller 12. The first coil group 431 and the second coil group 432 each include nine coils 43.

More specifically, the first coil group 431 includes three first U phase coils U11, U12, and U13, three first V phase coils V11, V12, and V13, and three first W phase coils W11, W12, and W13. The second coil group 432 includes three second U phase coils U21, U22, and U23, three second V phase coils V21, V22, and V23, and three second W phase coils W21, W22, and W23.

The six neutral point bus bars 51 includes three first neutral point bus bars B11, B12, and B13 pertaining to the first controller 11, and three second neutral point bus bars B21, B22, and B23 pertaining to the second controller 12, for example.

The line ends 430 of each three coils 43 included in the first coil group 431 are connected to the corresponding one of the first neutral point bus bars B11, B12, and B13. Specifically, the line ends 430 of the first U phase coil U11, the first V phase coil V11, and the first W phase coil W11 are connected to the first neutral point bus bar B11. The line ends 430 of the first U phase coil U12, the first V phase coil V12 and the first W phase coil W12 are connected to the first neutral point bus bar B12. The line ends 430 of the first U phase coil U13, the first V phase coil V13 and the first W phase coil W13 are connected to the first neutral point bus bar B13.

The line ends 430 of each three coils 43 included in the second coil group 432 are connected to the corresponding one of the second neutral point bus bars B21, B22, and B23. Specifically, the line ends 430 of the second U phase coil U21, the second V phase coil V21, and the second W phase coil W21 are connected to the second neutral point bus bar B21. The line ends 430 of the second U phase coil U22, the second V phase coil V22 and the second W phase coil W22 are connected to the second neutral point bus bar B22. The line ends 430 of the second U phase coil U23, the second V phase coil V23 and the second W phase coil W23 are connected to the second neutral point bus bar B23.

In the present preferred embodiment, the first controller 11 and the second controller 12 each preferably include three neutral point bus bars 51 in the above manner. With the above, the number of coils 43 connected to each neutral point bus bar 51 can be three, which is a minimum number for a neutral point of a 3-phase motor. In the present preferred embodiment, connection and fixing between the neutral point bus bars 51 and the line ends 430 of the coils 43 are preferably performed by welding, for example.

When the neutral point bus bars 51 and the coils 43 are welded to each other, the temperatures of the neutral point bus bars 51 increase due to the welding heat. In the present preferred embodiment, the number of line ends 430 of the coils 43 connected to a single neutral point bus bar 51 is set to a minimum. With the above, welding work is able to be performed at an appropriate temperature even on the last connection portion 512 that is welded last in a single neutral point bus bar 51. In other words, welding is able to be performed under a stable condition in all the welding portions. Furthermore, since, for the sake of stabilization of the welding condition, the welding work does not have to be suspended to wait for the temperature of the neutral point bus bar 51 to decrease, the tact time of the welding work is able to be reduced.

With the above, during manufacturing of the stator assembly 20 of the present preferred embodiment, welding work is able to be, in order in the circumferential direction, performed on the connection portions 512 between the neutral point bus bars 51 and the line ends 430 of the coils 43 disposed at the same position in the radial direction. As a result, work efficiency of the welding work is improved further.

Among the six phase bus bars 53, a first U-phase bus bar 531, a first V-phase bus bar 532, and a first W-phase bus bar 533 pertain to the first controller 11, a second U-phase bus bar 534, a second V-phase bus bar 535, and a second W-phase bus bar 536 pertain to the second controller 12.

The line ends 430 of the three first U phase coils U11, U12, and U13 are connected to the first U-phase bus bar 531. The line ends 430 of the three first V phase coils V11, V12, and V13 are connected to the first V-phase bus bar 532. The line ends 430 of the three first W phase coils W11, W12, and W13 are connected to the first W-phase bus bar 533.

The line ends 430 of the three second U phase coils U21, U22, and U23 are connected to the second U-phase bus bar 534. The line ends 430 of the three second V phase coils V21, V22, and V23 are connected to the second V-phase bus bar 535. The line ends 430 of the three second W phase coils W21, W22, and W23 are connected to the second W-phase bus bar 536.

A detailed structure of the neutral point bus bar assembly 23 of the motor 1 will be described next. FIG. 3 is a plan view of the stator assembly 20 viewed from the first side in the axial direction. FIG. 4 is a perspective view of the stator assembly 20. FIG. 5 is a diagram illustrating the disposition of the coils and the neutral point bus bars in the stator assembly 20.

Figure 3:
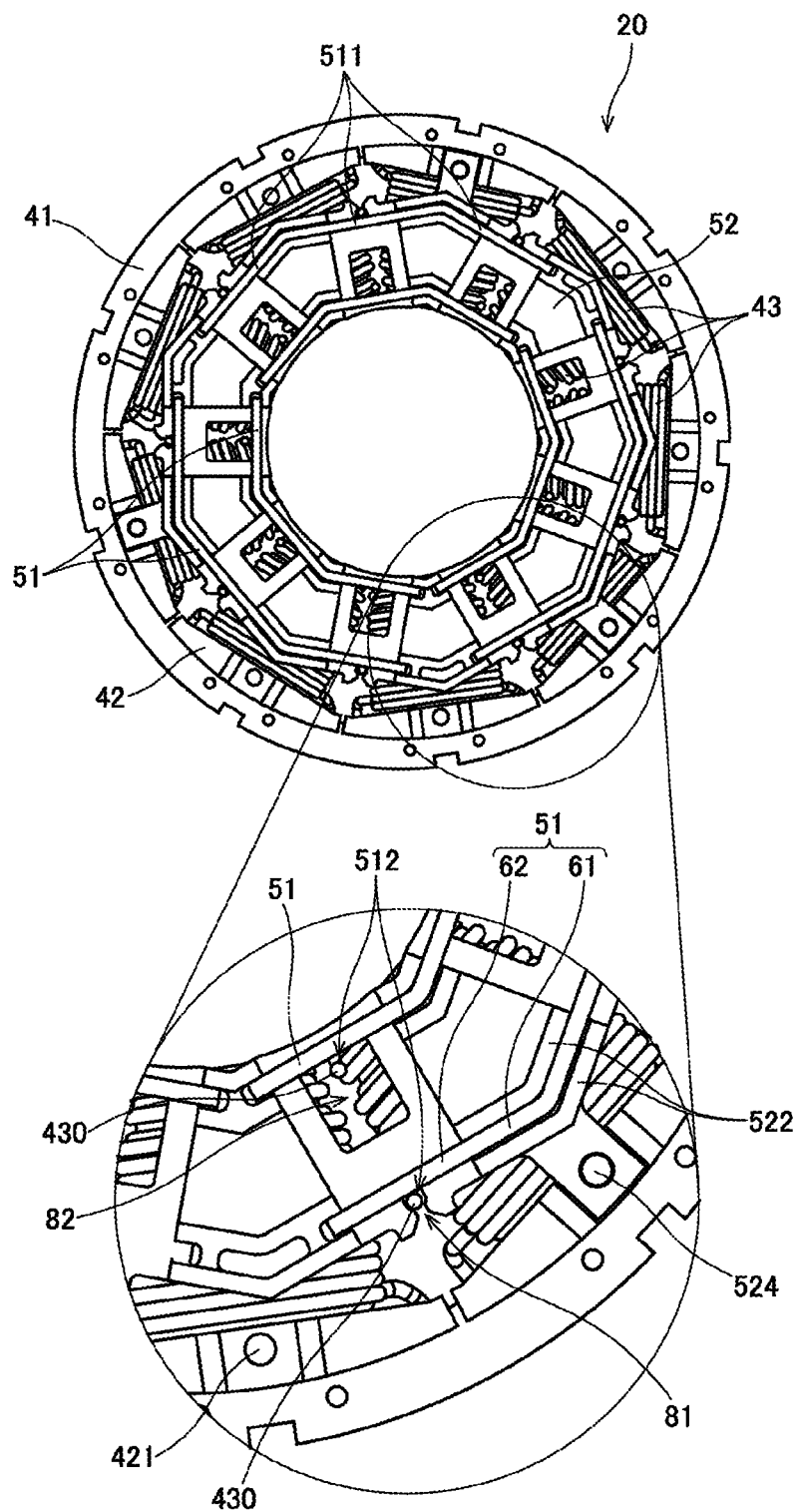
FIG. 3 is a plan view of the stator assembly according to a preferred embodiment of the present invention viewed from a first side in the axial direction.
Figure 4:
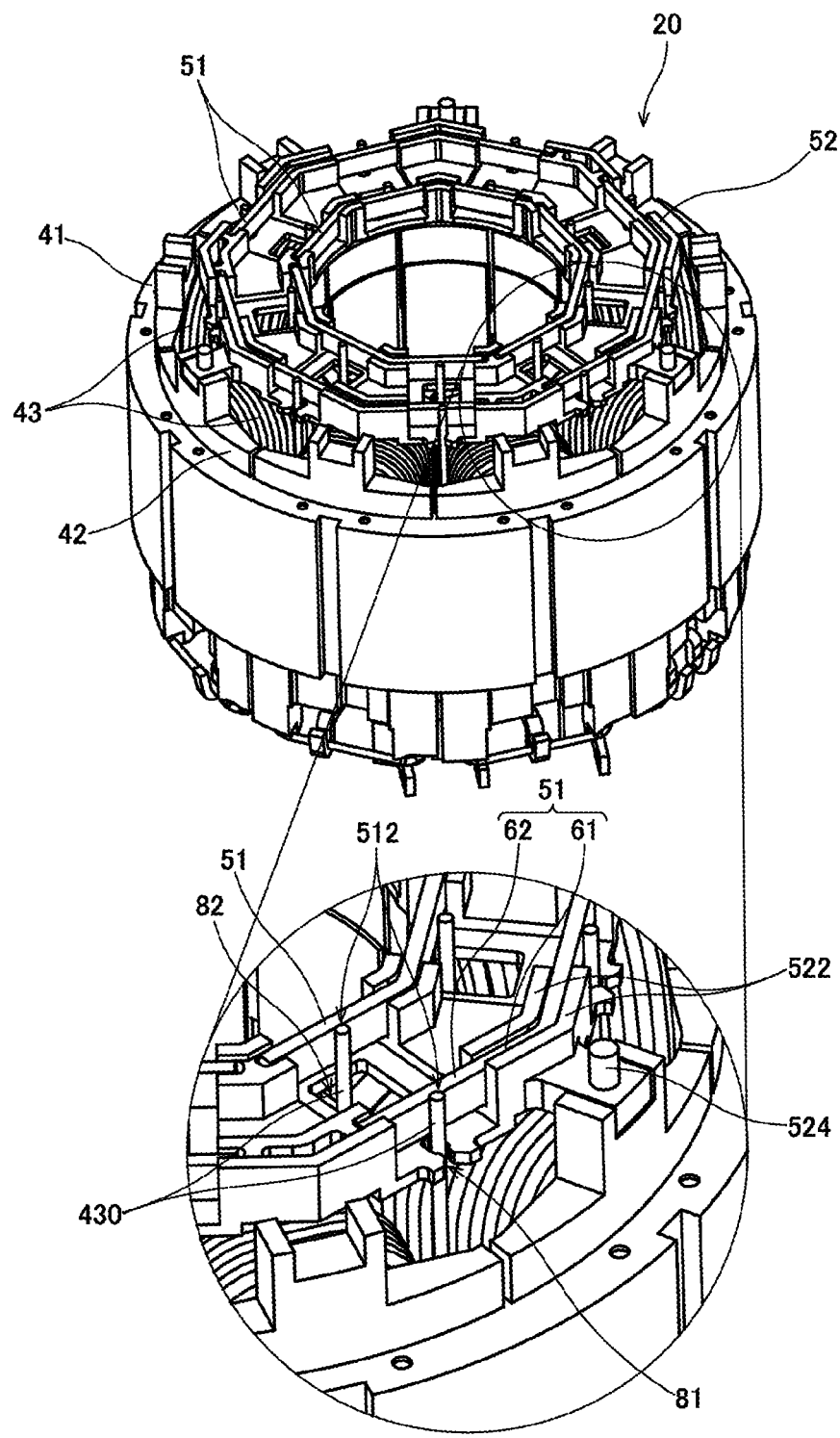
FIG. 4 is a perspective view of a stator assembly according to the present preferred embodiment of the present invention.
Figure 5:
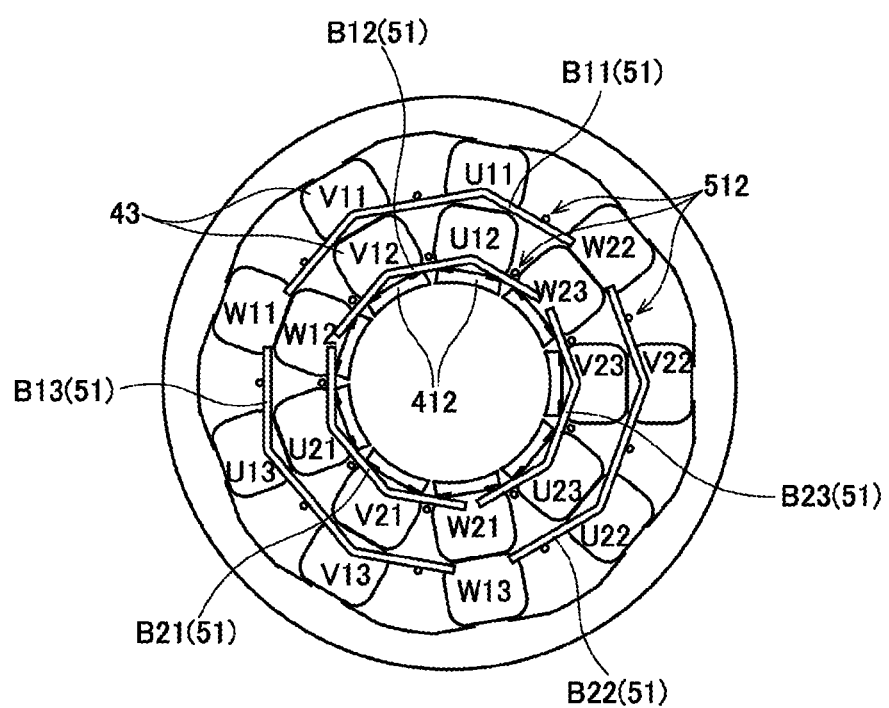
FIG. 5 is a diagram illustrating a disposition of coils and neutral point bus bars of the stator assembly according to a preferred embodiment of the present invention.

As illustrated in FIGS. 3 and 4, the neutral point bus bars 51 are preferably each defined by a flat plate-shaped member. As illustrated in FIGS. 3 and 5, the six neutral point bus bars 51 are disposed at two portions in the radial direction and at three portions in the circumferential direction. By being disposed in such a manner, the two neutral point bus bars 51 disposed at positions that are the same in each circumferential direction are disposed at positions that overlap each other in the radial direction. The three neutral point bus bars 51 disposed at the same positions in the radial direction are disposed at equal or substantially equal intervals in the circumferential direction. Note that "the same position" includes the same or substantially the same position. Furthermore, the two neutral point bus bars 51 "overlapping in the radial direction" refers to the two neutral point bus bars 51 being disposed on the same straight half line that extends outwardly in the radial direction from the central axis 9.

Meanwhile, in the motor 1, the coils 43 are preferably disposed at nine portions in the circumferential direction. In other words, in the motor 1, the stator core 41 includes nine teeth 412, for example. As illustrated in FIG. 5, two coils 43 are disposed on the circumference of each of the teeth 412. The two coils 43 are aligned in the radial direction.

In the motor 1 of the present preferred embodiment, the two first U phase coils U11 and U12, the two first V phase coils V11 and V12, the two first W phase coils W11 and W12, the first U phase coil U13 and the second U phase coil U21, the first V phase coil V13 and the second V phase coil V21, the first W phase coil W13 and the second W phase coil W21, the two second U phase coils U22 and U23, the two second V phase coils V22 and V23, and the two second W phase coils W22 and W23 are each disposed on a circumference of a corresponding one of the teeth 412 and are arranged in the circumferential direction in the above order.

As described above, in the present preferred embodiment, there are teeth 412 in which only the coils 43 included in the first coil group 431 are arranged on the circumference thereof, teeth 412 in which the coil 43 included in the first coil group 431 and the coil 43 included in the second coil group 432 are arranged on the circumference thereof, and teeth 412 in which only the coils 43 included in the second coil group 432 are arranged on the circumference thereof. In other words, an area in which the first coil group 431 is disposed and an area in which the second coil group 432 is disposed are separated from each other. With the above, in a case in which either one of the first controller 11 and the second controller 12 becomes uncontrollable, the coils 43 of the uncontrollable control system are not easily affected by the uncontrollable control system.

As illustrated in FIG. 5, the first U phase coil U11, the first V phase coil V11, and the first W phase coil W11 disposed on the outer side in the radial direction and the first neutral point bus bar B11 disposed on the outer side in the radial direction are connected to each other. Viewed in the axial direction, the first neutral point bus bar B11 is disposed in the vicinities of the inner ends of the connected three coils U11, V11, and W11 in the radial direction. The first U phase coil U12, the first V phase coil V12, and the first W phase coil W12 disposed on the inner side in the radial direction and the first neutral point bus bar B12 disposed on the inner side in the radial direction are connected to each other. Viewed in the axial direction, the first neutral point bus bar B12 is disposed in the vicinities of the inner ends of the connected three coils U12, V12, and W12 in the radial direction.

The first U phase coil U13, the first V phase coil V13, and the first W phase coil W13 disposed on the outer side in the radial direction and the first neutral point bus bar B13 disposed on the outer side in the radial direction are connected to each other. The first neutral point bus bar B13 is disposed in the vicinities of the inner ends of the connected three coils U13, V13, and W13 in the radial direction. The second U phase coil U21, the second V phase coil V21, and the second W phase coil W21 disposed on the inner side in the radial direction and the second neutral point bus bar B21 disposed on the inner side in the radial direction are connected to each other. Viewed in the axial direction, the second neutral point bus bar B21 is disposed in the vicinities of the inner ends of the connected three coils U21, V21, and W21 in the radial direction.

Moreover, the second U phase coil U22, the second V phase coil V22, and the second W phase coil W22 disposed on the outer side in the radial direction and the second neutral point bus bar B22 disposed on the outer side in the radial direction are connected to each other. Viewed in the axial direction, the second neutral point bus bar B22 is disposed in the vicinities of the inner ends of the connected three coils U22, V22, and W22 in the radial direction. The second U phase coil U23, the second V phase coil V23, and the second W phase coil W23 disposed on the inner side in the radial direction and the second neutral point bus bar B23 disposed on the inner side in the radial direction are connected to each other. Viewed in the axial direction, the second neutral point bus bar B23 is disposed in the vicinities of the inner ends of the connected three coils U23, V23, and W23 in the radial direction.

In the above manner, the coils 43 disposed on the inner side in the radial direction and the neutral point bus bars 51 disposed on the inner side in the radial direction are connected to each other, and the coils 43 disposed on the outer side in the radial direction and the neutral point bus bars 51 disposed on the outer side in the radial direction are connected to each other. In the motor 1 that includes the coil groups 431 and 432 of plural systems to provide redundancy, the number of coils 43 is large. However, owing to the relevant configuration, the arrangement of the lengths of conducting wire drawn out from the coils 43 is prevented from becoming complex even in the motor 1 with a large number of coils 43.

Furthermore, by disposing at least two neutral point bus bars 51 to overlap each other in the radial direction, the connection portions 512 between the neutral point bus bars 51 and the line ends 430 of the coils 43 are able to be distributed not only in the circumferential direction but in the radial direction as well. In the motor 1 that includes the coil groups 431 and 432 of plural systems to provide redundancy, the number of coils 43 is large. In other words, the number of connection portions 512 between the neutral point bus bars 51 and the line ends 430 of the coils 43 is large. However, owing to the relevant configuration, large intervals are able to be provided between the connection portions 512.

In the present preferred embodiment, three neutral point bus bars 51 are disposed at the same or substantially the same position in the radial direction and at positions that are different in the circumferential direction. Furthermore, the other three neutral point bus bars 51 are disposed at the same or substantially at the same position in the radial direction and at positions that are different in the circumferential direction. By splitting and disposing the neutral point bus bars 51 in the circumferential direction, the process of installing the bus bar in the motor is facilitated. Furthermore, owing to such a disposition, the yield in manufacturing the neutral point bus bars 51 is improved.

Furthermore, the shapes of the three neutral point bus bars 51 disposed at the same or substantially at the same position in the radial direction are identical or substantially identical. With the above, manufacturing is able to be performed efficiently compared with a case in which the shapes of the six neutral point bus bars 51 are all different.

As illustrated in FIG. 3, each neutral point bus bar 51 preferably includes three flat plate-shaped portions 511. The plate-shaped portions 511 are flat plate-shaped portions that extend in the axial direction and the circumferential direction. A single connection portion 512 with a line end 430 of a coil 43 is disposed in a single plate-shaped portion 511. By providing the connection portions 512 in the flat plate-shaped portions 511 in the above manner, welding work is able to be carried out easily compared to performing welding on a curved neutral point bus bar 51.

As illustrated in FIGS. 3 and 5, in the present preferred embodiment, the shape of the neutral point bus bars 51 viewed in the axial direction defines a portion of a regular nonagon about the central axis 9. Meanwhile, there are nine teeth 412 of the stator core 41. By arranging the neutral point bus bars 51 along the regular nonagon, the lengths of the plate-shaped portions 511 disposed at the same positions in the radial direction can be long. As described above, in a case in which there are N numbers of teeth 412, by arranging the neutral point bus bars 51 along a regular N-sided polygon, N pieces of plate-shaped portions 511 long in the circumferential direction is able to be formed efficiently. As a result, welding work between the neutral point bus bars 51 and the line ends 430 of the coils 43 is able to be performed more easily.

As illustrated in FIG. 5, in the present preferred embodiment, the connection portions 512 between the neutral point bus bars 51 and the line ends 430 of the coils 43 are all positioned outside the neutral point bus bars 51 in the radial direction. It is desirable that all of the connection portions 512 are disposed in the above manner on either the inside of the neutral point bus bars 51 in the radial direction or the outside thereof in the radial direction. By so doing, when welding the neutral point bus bars 51 and the line ends 430 of the coils 43 to each other, all of the connection portions 512 are able to be welded without changing the direction of the welding jig. Accordingly, productivity of the motor 1 is improved.

Furthermore, each neutral point bus bar 51 of the present preferred embodiment is preferably formed by bending a flat plate-shaped copper plate at two portions. Accordingly, there is a possibility of a force trying to return the neutral point bus bar 51 to a flat plate shape is created by a springback. In a case in which a force is created by the relevant springback, among the three plate-shaped portions 511 of each neutral point bus bars 51, the plate-shaped portions 511 on both ends in the circumferential direction try to move towards the outside in the radial direction.

In the above motor 1, as described above, the connection portions 512 are disposed on the outer side of the neutral point bus bars 51 in the radial direction. Accordingly, when a force is created in the neutral point bus bars 51 by the springback, the neutral point bus bars 51 move in a direction towards the line ends 430 of the coils 43. Accordingly, forces pushing the neutral point bus bars 51 and the line ends 430 of the coils 43 to each other are created. Accordingly, when a force is created in the neutral point bus bars 51 with the springback, the strength fixing the neutral point bus bars 51 and the line ends 430 of the coils 43 to each other is suppressed or prevented from decreasing.

Note that there is a concern that the springback occurs not only in the case, as in the present preferred embodiment, in which the neutral point bus bars 51 are bent at plural portions but also in a case in which the overall neutral point bus bars 51 are curved in an arc shape. Accordingly, even in a case in which the overall neutral point bus bars 51 are curved in an arc shape, it is desirable that the connection portions 512 are disposed on the outer side of the neutral point bus bars 51 in the radial direction.

Figure 6:
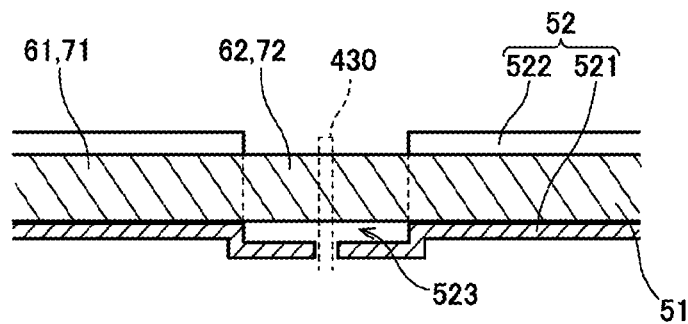
FIG. 6 is a diagram illustrating a positional relationship between the neutral point bus bar and a bus bar holder in a neutral point bus bar assembly according to the present preferred embodiment of the present invention.

A shape of the bus bar holder 52 will be described next. As illustrated in FIGS. 3, 4, and 6, the bus bar holder 52 includes a base portion 521 that extends in a perpendicular or substantially perpendicular manner with respect to the central axis 9, and holding portions 522 that extend from the base portion 521 towards the first side in the axial direction. The base portion 521 extends around the central axis 9 in an annular manner.

The holding portions 522 are disposed on the inner sides of the neutral point bus bars 51 in the radial direction and on the outer sides thereof in the radial direction. Accordingly, portions of the neutral point bus bars 51 are held between two holding portions 522 in the radial direction. With the above, the neutral point bus bars 51 are, with respect to the bus bar holder 52, suppressed or prevented from moving in the radial direction.

FIG. 6 is a diagram illustrating a positional relationship between the neutral point bus bar 51 and the bus bar holder 52. In FIG. 6, longitudinal sections of the neutral point bus bar 51 and the bus bar holder 52 are illustrated in a conceptual manner. In FIG. 6, the line end 430 of the coil 43 is illustrated by broken lines.

Note that a portion of each neutral point bus bar 51 in the circumferential direction is referred to as a held portion 61, and the remaining portion is referred to as an exposed portion 62. As illustrated in FIG. 6, at least a portion of the two lateral surfaces of the held portion 61 in the radial direction is covered by the bus bar holder 52. In other words, at least a portion of the two lateral surfaces of the held portion 61 in the radial direction is covered by the holding portion 522. The two lateral surfaces of the exposed portion 62 in the radial direction are exposed from the bus bar holder 52. The held portion 61 and the exposed portion 62 are adjacent to each other in the circumferential direction.

The connection portions 512 between the neutral point bus bars 51 and the line ends 430 of the coils 43 are preferably disposed at the exposed portions 62. With the above, even if the neutral point bus bars 51 do not include terminals that protrude in the axial direction or in the radial direction, the neutral point bus bars 51 and the line ends 430 of the coils 43 are able to be electrically connected to each other easily. As a result, the size of the motor 1 is able to be reduced without reducing the work efficiency when the motor 1 is manufactured.

Furthermore, a portion of each neutral point bus bar 51 in the circumferential direction is referred to as a contact portion 71, and the remaining portion thereof is referred to as a contactless portion 72. As illustrated in FIG. 6, an end surface of the contact portion 71 on the second side in the axial direction and an end surface of the base portion 521 of the bus bar holder 52 on the first side in the axial direction are in contact with each other. An end surface of each contactless portion 72 on the second side in the axial direction faces the space. Note that at least a portion of each contactless portion 72 overlaps the corresponding exposed portion 62. The contact portion 71 and the contactless portion 72 are adjacent to each other in the circumferential direction.

As illustrated in FIGS. 4 and 6, the base portion 521 of the present preferred embodiment includes recesses 523 that are each a surface of the base portion 521 on the first side in the axial direction recessed towards the second side in the axial direction. Each end surface of the recess 523 on the first side in the axial direction and the end surface of the corresponding neutral point bus bar 51 on the second side in the axial direction oppose each other with a gap in the axial direction. Accordingly, in the neutral point bus bars 51, the portions that overlap the recesses 523 in the axial direction are the contactless portions 72.

The connection portions 512 between the neutral point bus bars 51 and the line ends 430 of the coils 43 are preferably disposed at the contactless portions 72. With the above, the neutral point bus bars 51 and the line ends 430 of the coils 43 welded to each other to the end portions of the neutral point are able to be bus bars 51 on the second side in the axial direction. In other words, the areas in which the neutral point bus bars 51 and the line ends 430 of the coils 43 are welded to each other are able to be made large. Accordingly, the welding condition is stable, and the strength fixing the neutral point bus bars 51 and the line ends 430 of the coils 43 to each other is improved.

Note that in the present preferred embodiment, as illustrated in FIG. 6, the positions of the held portions 61 and the positions of the contact portions 71 preferably coincide each other. Furthermore, the positions of the exposed portions 62 and the positions of the contactless portions 72 preferably coincide each other. In FIG. 6, in the neutral point bus bars 51, the boundaries between the portions that are the held portions 61 and the contact portions 71, and the portion that is the exposed portion 62 and the contactless portion 72 are illustrated by broken lines.

Furthermore, as illustrated in FIG. 6, the end portions of the line ends 430 of the coils 43 on the first side in the axial direction, the coils 43 being connected to the neutral point bus bars 51, are disposed on the first side in the axial direction with respect to the end portions of neutral point bus bars 51 on the first side in the axial direction. With the above, the neutral point bus bars 51 and the line ends 430 of the coils 43 are able to be welded to each other to the end portions of the neutral point bus bars 51 on the first side in the axial direction. In other words, the areas in which the neutral point bus bars 51 and the line ends 430 of the coils 43 are welded to each other are able to be made even greater. Accordingly, the welding condition becomes stable, and the strength fixing the neutral point bus bars 51 and the line ends 430 of the coils 43 to each other is improved further.

As illustrated in FIGS. 3 and 4, the base portion 521 preferably includes first coil line guiding portions 81 and second coil line guiding portions 82. The first coil line guiding portions 81 are each a cut-out that is cut out from the outer end portion of the base portion 521 in the radial direction towards the outer side of the neutral point bus bar 51 in the radial direction. The line ends 430 of the coils 43 connected to the outer side of the neutral point bus bars 51 in the radial direction are each disposed inside the first coil line guiding portions 81.

By having the base portion 521 include the first coil line guiding portions 81, when assembling the stator assembly 20, the line ends 430 of the coils 43 are able to be easily disposed near the lateral surface of the neutral point bus bars 51 on the outer side in the radial direction. Accordingly, the manufacturing efficiency of the motor 1 is improved. Furthermore, by having the base portion 521 include the first coil line guiding portions 81, when welding the neutral point bus bars 51 and the line ends 430 of the coils 43 to each other, misalignment of the line ends 430 of the coils 43 is suppressed or prevented. As a result, the welding condition becomes stable, and the strength fixing the neutral point bus bars 51 and the line ends 430 of the coils 43 to each other are improved.

The second coil line guiding portions 82 are through holes that penetrate in the axial direction. Viewed in the axial direction, the second coil line guiding portions 82 overlap radial-direction outer ends of the neutral point bus bars 51 on the inner side in the radial direction. By having the base portion 521 include the second coil line guiding portions 82, when assembling the stator assembly 20, the line ends 430 of the coils 43 are able to be easily disposed near the lateral surface of the neutral point bus bars 51 on the inner side in the radial direction. Accordingly, the manufacturing efficiency of the motor 1 is improved.

As illustrated in FIG. 4, in the present preferred embodiment, the bus bar holder 52 preferably includes projections 524 that are projected towards the first side in the axial direction. End portions of the projections 524 on the first side in the axial direction are disposed on the first side in the axial direction with respect to the neutral point bus bars 51 and the end portions of the line ends 430 of the coils 43 on the first side in the axial direction. With the above, even when the first side of the stator assembly 20 in the axial direction is mounted downwards on a workbench or the like, the line ends 430 of the coils 43 do not come in contact with the workbench or the like. As a result, breaking of the conducting wire constituting the coils 43 or the separation between the neutral point bus bars 51 and the line ends 430 of the coils 43 at the connection portions 512 is prevented.

As illustrated in FIG. 1, the neutral point bus bar assembly 23 is preferably disposed on the first side of the coils 43 in the axial direction, and the phase bus bar assembly 24 is preferably disposed on the second side of the coils 43 in the axial direction. In other words, the six neutral point bus bars 51 are all disposed on the first side of the coils 43 in the axial direction, and the six phase bus bars 53 are all disposed on the second side of the coils 43 in the axial direction, for example. By disposing the neutral point bus bars 51 and the phase bus bars 53 on opposite sides of the stator 22 in the axial direction in the above manner, the layout area of the neutral point bus bars 51 is able to be large. With the above, the connection portions 512 between the neutral point bus bars 51 and the line ends 430 of the coils 43 are able to be disposed with gaps in between. Accordingly, efficiency of the welding work between the neutral point bus bars 51 and the line ends 430 of the coils 43 is improved.

Figure 7:
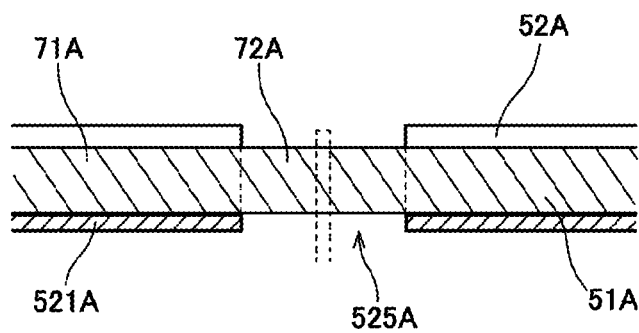
FIG. 7 is a diagram illustrating a positional relationship between a neutral point bus bar and a bus bar holder in a neutral point bus bar assembly according to a modification of a preferred embodiment of the present invention.

FIG. 7 is a diagram illustrating a positional relationship between a neutral point bus bar 51A and a bus bar holder 52A of a neutral point bus bar assembly according to a modification of a preferred embodiment of the present invention. In FIG. 7, a hole portion 525A is preferably provided in a base portion 521A below the neutral point bus bar 51A. The hole portion 525A is a through hole that penetrates the base portion 521A in the axial direction. With the above, in the neutral point bus bars 51A, portions that overlap the hole portions 525A in the axial direction become contactless portions 72A in which end surfaces of the portions on the second side in the axial direction face the space.

Figure 8:
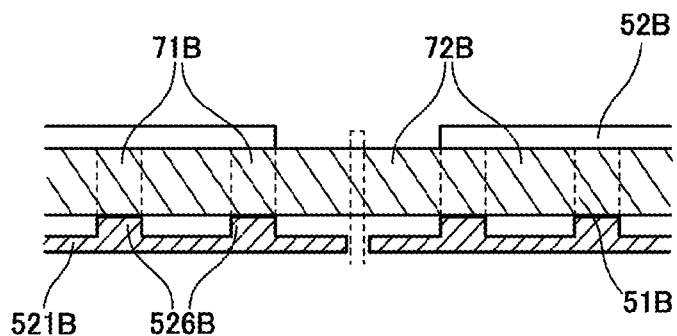
FIG. 8 is a diagram illustrating a positional relationship between a neutral point bus bar and a bus bar holder in a neutral point bus bar assembly according to a modification of the present preferred embodiment of the present invention.

FIG. 8 is a diagram illustrating a positional relationship between a neutral point bus bar 51B and a bus bar holder 52B of a neutral point bus bar assembly according to another modification of a preferred embodiment of the present invention. In FIG. 8, end surfaces of a base portion 521B on the first side in the axial direction and an end surface of the neutral point bus bar 51B on the second side in the axial direction oppose each other with gaps in the axial direction. The base portion 521B includes protruded portions 526B that protrude from the end surface thereof on the first side in the axial direction towards the first side in the axial direction. End surfaces of the protruded portions 526B on the first side in the axial direction is in contact with the end surface of the neutral point bus bar 51B on the second side in the axial direction.

With the above, in the neutral point bus bars 51B, portions that overlap the protruded portions 526B in the axial direction become contact portions 71B in which end surfaces of the portions on the second side in the axial direction are in contact with the bus bar holder 52B. In the neutral point bus bars 51B, portions that do not overlap the protruded portions 526B in the axial direction become contactless portions 72B in which end surfaces of the portions on the second side in the axial direction face the space.

As in the example in FIGS. 7 and 8, even if the base portion of the bus bar holder does not have a recess, a contactless portion is able to be provided in the neutral point bus bar. With the above, by disposing the connection portions between the neutral point bus bars and the line ends of the coils at the contactless portions, the neutral point bus bars and the line ends of the coils are able to be welded to each other to the end portions of the neutral point bus bars on the second side in the axial direction. In other words, the areas in which the neutral point bus bars and the line ends of the coils are welded to each other are able to be made large. Accordingly, the welding condition becomes stable, and the strength fixing the neutral point bus bars and the line ends of the coils to each other is improved.

Figure 9:
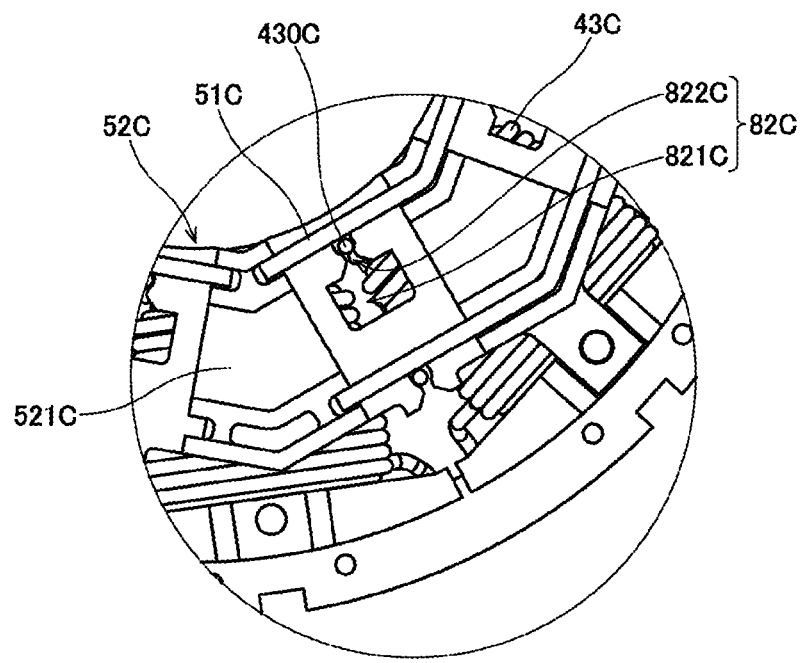
FIG. 9 is a partial plan view of a stator assembly according to a modification of a preferred embodiment of the present invention.

FIG. 9 is a partial plan view of a stator assembly 20C according to another modification of a preferred embodiment of the present invention. In the above stator assembly 20C, a base portion 521C of a bus bar holder 52C includes second coil line guiding portions 82C. The second coil line guiding portions 82C each include a through hole 821C and a cut-out 822C.

The through hole 821C penetrates the base portion 521C in the axial direction. Each through hole 821C is disposed on an outer side in the radial direction of the corresponding neutral point bus bar 51C on the inner side in the radial direction. Each cut-out 822C is cut out from the through hole 821C towards the corresponding neutral point bus bar 51C on the inner side in the radial direction. Line ends 430C of coils 43C connected to the inner side of the neutral point bus bars 51C in the radial direction are each disposed inside the corresponding cut-out 822C.

By having the base portion 521C include the second coil line guiding portions 82C, when assembling the stator assembly 20C, the line ends 430C of the coils 43C are able to be easily disposed near the lateral surface of the neutral point bus bars 51C on the inner side in the radial direction. Accordingly, the manufacturing efficiency of a motor 1C is improved. Furthermore, by having the base portion 521C include the cut-outs 822C, when welding the neutral point bus bars 51C and the line ends 430C of the coils 43C to each other, misalignment of the line ends 430C of the coils 43C is suppressed or prevented. As a result, the welding condition becomes stable, and the strength fixing the neutral point bus bars 51C and the line ends 430C of the coils 43C to each other is improved.

Figure 10:
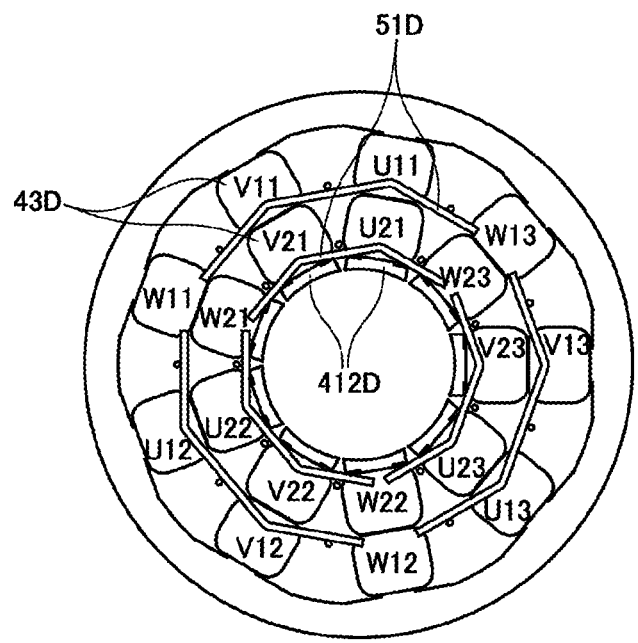
FIG. 10 is a diagram illustrating a disposition of coils and neutral point bus bars in a stator assembly according to a modification of a preferred embodiment of the present invention.

FIG. 10 is a diagram illustrating a disposition of the coils 43D and the neutral point bus bars 51D in a stator assembly according to another modification of a preferred embodiment of the present invention.

In FIG. 10, the first U phase coil U11 and the second U phase coil U21, the first V phase coil V11 and the second V phase coil V21, the first W phase coil W11 and the second W phase coil W21, the first U phase coil U12 and the second U phase coil U22, the first V phase coil V12 and the second V phase coil V22, the first W phase coil W12 and the second W phase coil W22, the first U phase coil U13 and the second U phase coil U23, the first V phase coil V13 and the second V phase coil V23, and the first W phase coil W13 and the second W phase coil W23 are each disposed on a circumference of the corresponding one of the teeth 412D and are arranged in the circumferential direction in the above order.

The coils 43D pertaining to the first control system and the coils 43D pertaining to the second control system may be arranged on the circumference of all the teeth 412D in the above manner. With the above, even when either one of the two control systems becomes uncontrollable, the magnetic force generated in each of the teeth 412D is able to be generated in the circumferential direction at equal or substantially equal intervals.

Figure 11:
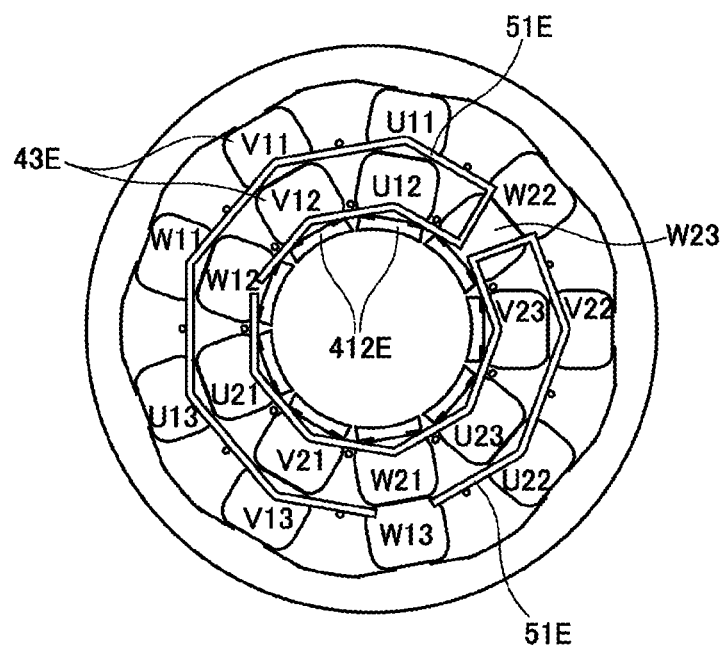
FIG. 11 is a diagram illustrating a disposition of coils and neutral point bus bars in a stator assembly according to a modification of a preferred embodiment of the present invention.

FIG. 11 is a diagram illustrating a disposition of the coils 43E and the neutral point bus bars 51E in a stator assembly according to another modification of a preferred embodiment of the present invention. In FIG. 11, each control system preferably includes a single neutral point bus bar 51E. In other words, the above stator assembly includes two neutral point bus bars 51E. Accordingly, all of the nine coils 43E pertaining to the first control system are connected to a first neutral point bus bars 51E. All of the nine coils 43E pertaining to the second control system are connected to a second neutral point bus bars 51E. As described above, a single neutral point bus bar 51E may be connected to four or more coils 43E.

Figure 12:
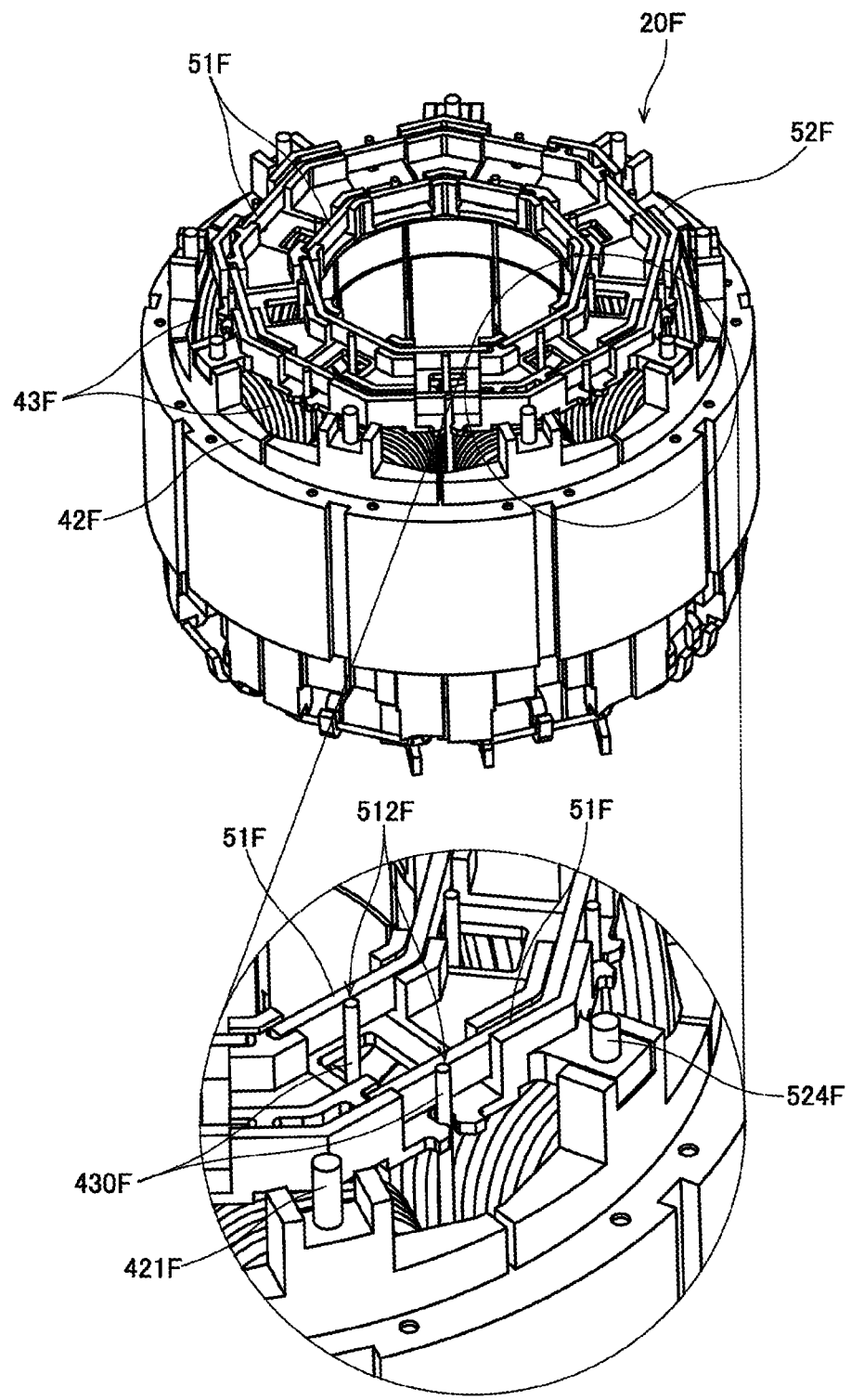
FIG. 12 is a perspective view of a stator assembly according to a modification of a preferred embodiment of the present invention.

FIG. 12 is a perspective view of a stator assembly 20F according to another modification of a preferred embodiment of the present invention. In the above preferred embodiments, the bus bar holder 52 preferably includes projections 524 that are projected towards the first side in the axial direction. In FIG. 12, a bus bar holder 52F includes projections 524F that are projected towards the first side in the axial direction, and insulators 42F include insulator projections 421F that are projected towards the first side in the axial direction.

End portions of the projections 524F and the insulator projections 421F on the first side in the axial direction are disposed on the first side in the axial direction with respect to neutral point bus bars 51F and end portions of line ends 430F of coils 43F on the first side in the axial direction. With the above, even when the first side of the stator assembly 20F in the axial direction is mounted downwards on a workbench or the like, the line ends 430F of the coils 43F do not come in contact with the workbench or the like. As a result, breaking of the conducting wire constituting the coils 43F or the separation between the neutral point bus bars 51F and the line ends 430F of the coils 43F at connection portions 512F is prevented.

The number of teeth 412 in the stator 22 of the present preferred embodiment described above is nine and the number of coils 43 is 18, for example. In other words, in the stator 22 of the present preferred embodiment described above, the number of slots is preferably nine, and the number of control systems is preferably two, for example. However, the present disclosure is not limited to the above. In the stator 22, the number of slots is not limited to nine and, for example, may be six or 12. Furthermore, the number of control systems in the motor 1 may be three or more.

In the stator 22 in the preferred embodiments described above, two coils 43 are preferably disposed on the circumference of one of the teeth 412. However, the present disclosure is not limited to the above. In the stator 22, a single coil may be disposed on a circumference of one of the teeth, or three or more coils may be disposed on a circumference of one of the teeth. Furthermore, in the present preferred embodiment described above, two coils are arranged on one of the teeth 412 in the radial direction; however, the present disclosure is not limited to the above. Two coils may be disposed on one of the teeth 412 so as to overlap each other at the same radial direction position. Furthermore, the winding method of the coils is not limited to concentrated winding and may be bifilar winding.

In the preferred embodiments described above, the first controller 11 and the second controller 12 preferably operate separately; however, the present disclosure is not limited to the above. The first controller 11 and the second controller 12 may be interlocked and controlled by a single controller. However, in such a case as well, it is desirable that the coils pertaining to the first controller 11, the neutral point bus bars, and the phase bus bars, and the coils penetrating to the second controller 12, the neutral point bus bars, and the phase bus bars are not electrically connected to each other in the motor 1.

In the motor of the preferred embodiments described above, the motor is preferably an inner rotor motor; however, an outer rotor motor may be used in the present disclosure.

The detailed shapes of the members may be different from the shapes illustrated in the drawings of the present application. Furthermore, the elements described above may be combined appropriately within the range producing no contradictions.

Features of the above-described preferred embodiments and the modifications thereof may be combined appropriately as long as no conflict arises.

Preferred embodiments of the present disclosure can be used in a motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
   a stator; and
   a plurality of neutral point bus bars, wherein
   the stator includes:
      a stator core including a core back annular about a central axis, and a plurality of teeth extending from the core back in a radial direction, and
      a plurality of coils defined by lengths of conducting wire wound around circumferences of the teeth,
   the plurality of coils include:
      a first coil group that includes ones of the plurality of coils pertaining to a first control system, and
      a second coil group that includes ones of the plurality of coils pertaining to a second control system,
   the plurality of neutral point bus bars are on a first side of the coils in an axial direction,
   the plurality of neutral point bus bars include:
      a first neutral point bus bar to which line ends of at least three of the coils included in the first coil group are connected, and
      a second neutral point bus bar to which line ends of at least three of the coils included in the second coil group are connected,
   at least two of the plurality of neutral point bus bars are located at positions that overlap each other in the radial direction,
   coils of the first coil group are provided on the circumference of each of the teeth, and coils of the second coil group are provided on the circumference of each of the teeth,
   the coils of the first coil group are aligned with the coils of the second coil group in the radial direction,
   the line ends of the at least three of the coils included in the first coil group and the line ends of the at least three of the coils included in the second coil group are led from each of the teeth, and
   the line ends of the at least three of the coils included in the first coil group and the line ends of the at least three of the coils included in the second coil group are provided at a same position in a circumferential direction of the core back.

2. The motor according to claim 1, wherein at least two of the plurality of neutral point bus bars are at a same position in the radial direction and at different positions in the circumferential direction.

3. The motor according to claim 2, wherein the neutral point bus bars that are disposed at the same position in the radial direction have a same shape.

4. The motor according to claim 2, wherein line ends of three of the coils are electrically connected to the neutral point bus bars.

5. The motor according to claim 2, wherein in the plurality of neutral point bus bars disposed at the same position in the radial direction, connection portions between the neutral point bus bars and the line ends of the coils are positioned either on an inner side of the neutral point bus bars in the radial direction or on an outer side thereof in the radial direction.

6. The motor according to claim 1, wherein in a single neutral point bus bar of the neutral point bus bars, an electrical connection of the connection portions between the neutral point bus bars and the line ends of the coils is positioned either on an inner side of the neutral point bus bars in the radial direction or on an outer side thereof in the radial direction.

7. The motor according to claim 1, wherein the stator further includes:
   a bus bar holder that holds the neutral point bus bars,
   each neutral point bus bar includes a flat plate-shaped portion that extends in the axial direction and in the circumferential direction,
   each neutral point bus bar includes:
      a held portion in which at least a portion of two lateral surfaces thereof in the radial direction is covered by the bus bar holder, and
      an exposed portion that is adjacent to the held portion in the circumferential direction, two lateral surfaces of the exposed portion in the radial direction being exposed from the bus bar holder, and
   electrical connections between the neutral point bus bars and the line ends of the coils are each disposed at a corresponding exposed portion.

8. The motor according to claim 7, wherein each neutral point bus bar includes:
   a contact portion in which an end surface of the neutral point bus bar on a second side of the motor in the axial direction is in contact with an end surface of the bus bar holder on a first side of the motor in the axial direction, and
   a contactless portion adjacent to the held portion in the circumferential direction, an end surface of the contactless portion on the second side in the axial direction opposing a space and at least a portion of the contactless portion overlapping the exposed portion, and
   electrical connections between the neutral point bus bars and the line ends of the coils are each at a corresponding contactless portion.

9. The motor according to claim 7, wherein the bus bar holder includes:
   a coil line guiding portion that includes at least either of a cut-out that is cut out from an end portion in the radial direction and a through hole that penetrates in the axial direction, and
   at least one of the line ends of the plurality of coils is disposed inside the coil line guiding portion.

10. The motor according to claim 9, wherein the coil line guiding portion is positioned at either an inner side of the relevant neutral point bus bar in the radial direction or an outer side thereof in the radial direction.

11. The motor according to claim 7, wherein end portions of the line ends on the first side of the coil in the axial direction are on a second side of the motor in the axial direction with respect to an end portion of the bus bar holder on a first side of the motor in the axial direction.

12. The motor according to claim 1, wherein end portions of line ends on the first side of the coil in the axial direction are on a first side of the motor in the axial direction with respect to end portions of the neutral point bus bars on the first side of the motor in the axial direction.

13. The motor according to claim 1, wherein
   assuming that N is an integral number equal to or greater than 3,
   N numbers of teeth are included,
   the neutral point bus bars each have a shape that extends in the axial direction and in the circumferential direction, a shape of the neutral point bus bars viewed in the axial direction defines a portion of a regular N-sided polygon about the central axis.

14. The motor according to claim 1, wherein the stator includes:
a plurality of phase bus bars disposed on a second side of the coils in the axial direction, the plurality of phase bus bars being electrically connected to portions of the coils.

15. The motor according to claim 1, further comprising:
a rotating portion including a shaft extending along the central axis, and a rotor,
a stationary portion including a stator and a housing, and
a bearing that supports the shaft in a rotatable manner with respect to the housing, wherein
the rotor includes a magnet opposing end surfaces of the teeth in the radial direction,
the housing includes:
a cylindrical portion that extends in the axial direction and that houses the stator and the rotor therein in the radial direction, and
a first lid portion that extends in the radial direction at a first side of the stator in the axial direction,
the first lid portion includes a bearing housing the houses the bearing, and
the neutral point bus bars overlap the bearing in the radial direction.

16. The motor according to claim 1, further comprising:
a plurality of phase bus bars;
a first bearing on a first side of the motor in the axial direction with respect to the rotor; and
a second bearing on a second side of the motor in the axial direction with respect to the rotor;
the neutral point bus bars and the first bearing are provided at a same position in the axial direction; and
the plurality of phase bus bars and the second bearing are provided at a same position in the axial direction.

* * * * *